US012142229B2

(12) United States Patent
Kim et al.

(10) Patent No.: US 12,142,229 B2
(45) Date of Patent: Nov. 12, 2024

(54) DISPLAY DEVICE

(71) Applicant: LG Display Co., Ltd., Seoul (KR)

(72) Inventors: Jongtaek Kim, Paju-si (KR); Chan Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/963,100

(22) Filed: Oct. 10, 2022

(65) Prior Publication Data

US 2023/0215384 A1 Jul. 6, 2023

(30) Foreign Application Priority Data

Dec. 30, 2021 (KR) ........................ 10-2021-0193166

(51) Int. Cl.

| | |
|---|---|
| ***G09G 3/3291*** | (2016.01) |
| ***G09G 3/20*** | (2006.01) |
| ***G09G 3/3233*** | (2016.01) |

(52) U.S. Cl.

CPC ......... *G09G 3/3291* (2013.01); *G09G 3/2007* (2013.01); *G09G 3/3233* (2013.01); *G09G 2300/0819* (2013.01); *G09G 2300/0842* (2013.01); *G09G 2310/027* (2013.01); *G09G 2310/0286* (2013.01); *G09G 2310/08* (2013.01); *G09G 2320/0209* (2013.01); *G09G 2320/0223* (2013.01); *G09G 2320/0233* (2013.01); *G09G 2320/0242* (2013.01); *G09G 2330/028* (2013.01); *G09G 2360/16* (2013.01)

(58) Field of Classification Search

CPC ....... G09G 2360/16; G09G 2320/0626; G09G 2320/0233; G09G 2320/066; G09G 2320/0646; G09G 2320/0276; G09G 2320/0271; G09G 2320/043; G09G 3/3648; G09G 3/3406; G09G 3/3233; G09G 3/3426; G09G 3/3291; G09G 3/2007; G09G 2300/0819; G09G 2300/0842; G09G 2310/027; G09G 2310/0286; G09G 2310/08; G09G 2320/0209; G09G 2320/0223; G09G 2320/0242; G09G 2330/028; G09G 2320/0285; G09G 3/2003; G09G 2320/0666; G09G 3/3208; G09G 5/02; G09G 2300/043

See application file for complete search history.

(56) References Cited

U.S. PATENT DOCUMENTS

| | | | | |
|---|---|---|---|---|
| 9,361,823 B2 | 6/2016 | Takahama et al. | | |
| 2008/0170014 A1* | 7/2008 | Jung | .................... | G09G 3/3233 345/82 |

(Continued)

FOREIGN PATENT DOCUMENTS

| | | | |
|---|---|---|---|
| JP | 2003280590 A | 10/2003 | |
| WO | WO 2013136998 A1 | 9/2013 | |

*Primary Examiner* — Muhammad N Edun

(74) *Attorney, Agent, or Firm* — Seed IP Law Group LLP

(57) ABSTRACT

Disclosed is a display device comprising: a display panel on which a plurality of pixels of different colors are arrayed; a power supply configured to supply a high-potential driving voltage to the display panel; and a data driver configured to calculate an average picture level of input image data, and generate a data voltage based on a compensation value for compensating for a voltage drop of the high-potential driving voltage based on the calculated APL, wherein the compensation value is independently set for each of the colors.

8 Claims, 11 Drawing Sheets

(56) References Cited

U.S. PATENT DOCUMENTS

| | | | | |
|---|---|---|---|---|
| 2019/0147802 | A1* | 5/2019 | Li | H10K 59/35 345/694 |
| 2021/0193047 | A1* | 6/2021 | Kwon | G09G 3/3258 |
| 2021/0201801 | A1* | 7/2021 | Lee | G09G 3/3275 |

* cited by examiner

DISPLAY DEVICE

CROSS REFERENCE TO RELATED APPLICATION

The present application claims priority to Korean Patent Application No. 10-2021-0193166, filed on Dec. 30, 2021, which is herein incorporated by reference in its entirety.

BACKGROUND

Technical Field

The disclosure relates to a display device.

Description of the Related Art

An organic light-emitting diode (hereinafter, referred to as a light-emitting diode) of an organic light-emitting display device is self-emissive and does not need a separate light source, thereby decreasing the thickness and weight of the display device. Further, the organic light-emitting display device exhibits high-quality characteristics such as low power consumption, high brightness, fast response time, etc.

In general, the light emitting diode has a structure in which an anode, a bank surrounding an edge region of the anode, a light emitting layer formed on the anode within the bank, and a cathode covering the light emitting layer and the bank are stacked. Such a light emitting diode emits light with required brightness as a driving transistor controls the amount of current flowing in the light emitting diode.

BRIEF SUMMARY

One of the technical benefits of the disclosure is to relieve the difference in brightness on a display panel caused by fluctuation in a high-potential driving voltage, thereby improving display quality.

Further, one of the technical benefits of the disclosure is to prevent distortion of color coordinates when the high-potential driving voltage is compensated with respect to pixels of different colors.

According to at least one embodiment, a display device includes: a display panel on which a plurality of pixels of different colors are arrayed; a power supply configured to supply a high-potential driving voltage to the display panel; and a data driver configured to calculate an average picture level (APL) of input image data, and generate a data voltage based on a compensation value for compensating for a voltage drop of the high-potential driving voltage based on the calculated APL. The compensation value may be independently set for each of the colors.

The data driver may include: an APL calculator configured to calculate the APL; a memory configured to store the compensation value based on the APL; and a compensator configured to generate the data voltage based on the compensation value corresponding to the calculated APL.

The compensator may be independently provided corresponding to each of the colors.

The data driver may include: a shift register configured to output a sampling signal in response to a data driving control signal output from a timing controller; a latch configured to sample the image data into a digital data signal in response to the sampling signal; a reference voltage generator configured to generate a reference voltage; a gamma voltage generator configured to generate gamma voltages based on the reference voltage; and a digital-analog converter (DAC) configured to convert the digital data signal into an analog data signal based on the gamma voltages, and output the analog data signal as the data voltage.

The data driver may further include a compensation circuit configured to output the compensation value corresponding to the calculated APL, and the gamma voltage generator may be configured to receive a reference voltage to or from which the compensation value is added or subtracted.

The compensation circuit and the reference voltage generator may be independently provided corresponding to each of the colors.

The gamma voltages may be provided as different sets of gamma voltages to the pixels of different colors, respectively.

The data driver may be configured to set the compensation value for decreasing the data voltage when the calculated APL increases and set the compensation value for increasing the data voltage when the calculated APL decreases.

The compensation circuit may be configured to perform adding compensation for adding the compensation value to the reference voltage when the APL increases, and subtracting compensation for subtracting the compensation value from the reference voltage when the APL decreases.

The compensation value may be previously stored in a memory of the display device, or generated by detecting a fluctuation of the high-potential driving voltage by the display device, or received from outside of the display device.

According to some embodiments, a compensation method for a display device having a plurality of pixels of different colors comprises: calculating an average picture level (APL) of input image data; generating a data voltage based on a compensation value for compensating for a voltage drop of a high-potential driving voltage based on the calculated APL, wherein the compensation value is independently set for each of the colors.

DETAILED DESCRIPTION

Figure 1:
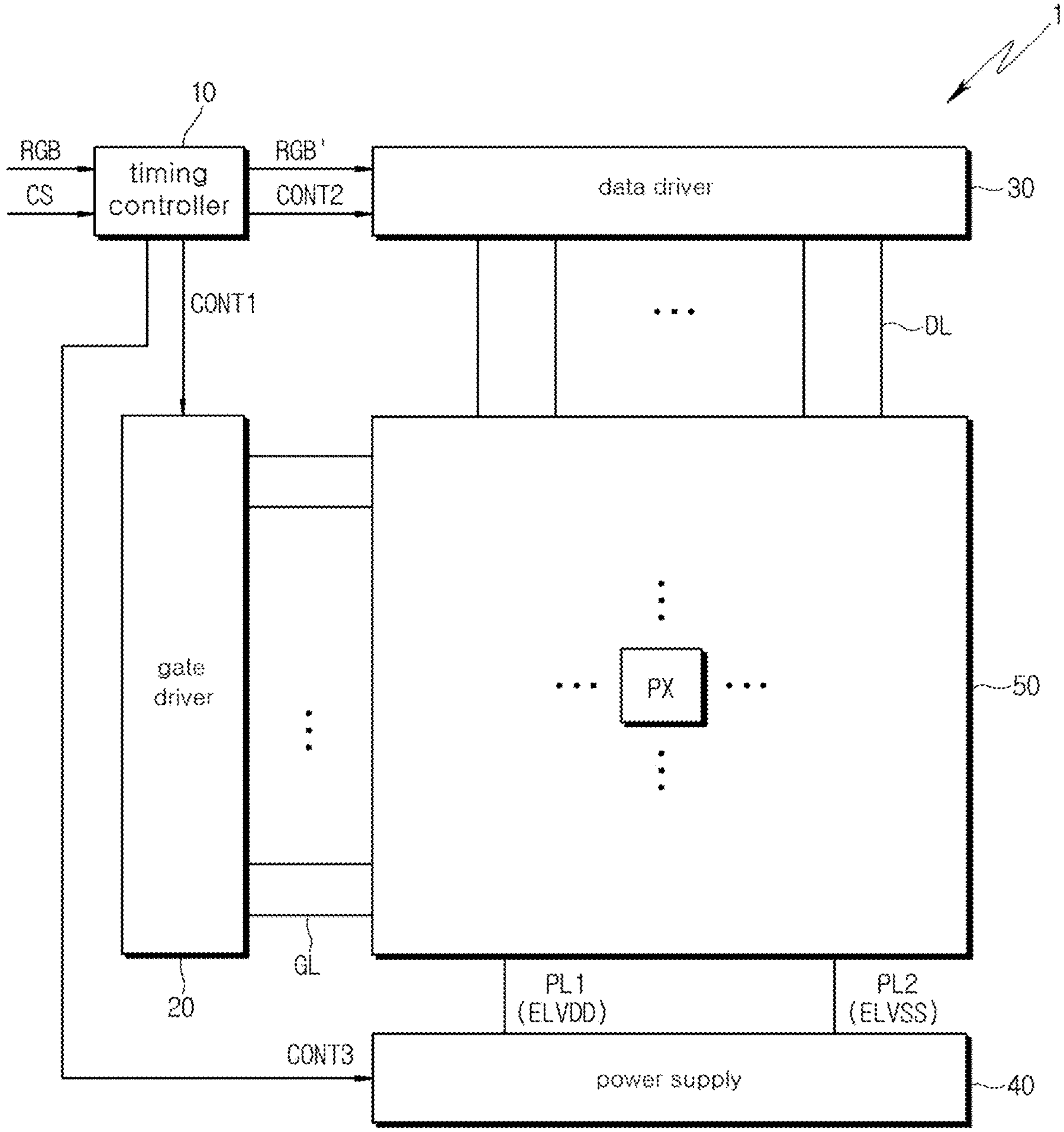
FIG. 1 is a block diagram of a display device according to an embodiment.

Below, embodiments are described with reference to the accompanying drawings. In this specification, when one element (or region, layer, portion) is referred to as being 'on', 'connected to,' or 'coupled to' another element, it can be directly disposed/connected/coupled on/to the one element, or an intervening third element may also be present.

Like reference numerals refer to like elements throughout. Also, in the accompanying drawings, the thickness, ratio, and dimensions of elements are exaggerated for clarity of illustration. The term "and/or" includes any and all combinations of one or more of the associated listed elements.

Although the terms such as 'first' and 'second' are used herein to describe various elements, these elements should not be limited by these terms. The terms are only used to distinguish one element from other elements. For example, a first element referred to as a first element in one embodiment can be referred to as a second element in another embodiment without departing from the scope of the appended claims. The terms of a singular form may include plural forms unless otherwise meant contextually.

Also, "under," "below," "above," "upper," and the like are used for explaining relation association of elements illustrated in the accompanying drawings. The terms may be a relative concept and described based on directions expressed in the accompanying drawings.

The term 'include' or 'comprise' specifies a property, a fixed number, a step, an operation, an element, a component or a combination thereof, but does not exclude other properties, fixed numbers, steps, operations, elements, components or combinations thereof.

FIG. 1 is a block diagram of a display device according to an embodiment.

Referring to FIG. 1, a display device 1 includes a timing controller 10, a gate driver 20, a data driver 30, a power supply 40, and a display panel 50.

The timing controller 10 may receive an image signal RGB and a control signal CS from the outside. The image signal RGB may include a plurality of grayscale data. The control signal CS may, for example, have a horizontal sync signal, a vertical sync signal, and a clock signal.

The timing controller 10 may process the image signal RGB and the control signal CS to be suitable for operating conditions of the display panel 50, thereby generating and outputting image data RGB', a scan driving control signal CONT1, a data driving control signal CONT2, and a power supply control signal CONT3.

The gate driver 20 may generate gate signals based on the gate driving control signal CONT1 output from the timing controller 10. The gate driver 20 may provide the generated gate signals to pixels PX through a plurality of gate lines GL. When the gate signals are supplied to the gate lines GL in sequence, the pixels PX may be selected in units of horizontal lines.

The data driver 30 may generate data signals based on the image data RGB' and data driving control signal CONT2 output from the timing controller 10. The data driver 30 may provide the generated data signals to the selected pixels PX through the plurality of data lines DL, when the pixels PX are selected by the scan signals in units of horizontal lines.

The power supply 40 may generate driving voltages ELVDD, ELVSS to be supplied to the display panel 50 based on the power supply control signal CONT3. The power supply 40 may supply the generated driving voltages to the pixels PX through the corresponding power lines PL1 and PL2.

On the display panel 50, a plurality of pixels PX (or sub-pixels) are arrayed. The pixels PX may, for example, be arrayed on the display panel 50 in the form of a matrix. The pixels PX are controlled to emit light with required brightness based on the gate signals and the data signals supplied through the gate lines GL and the data lines DL.

Each pixel PX may emit light in red, green, and blue. According to an embodiment, a set of pixels PX that emit light in red, green, and blue may be grouped into one unit pixel.

The timing controller 10, the gate driver 20, the data driver 30, and the power supply 40 may be respectively configured as individual integrated circuits (IC), or at least some of them may be integrated into an IC. For example, at least one of the data driver 30 and the power supply 40 may be integrated into the timing controller 10.

Further, the gate driver 20 is shown as an individual element separated from the display panel 50 in FIG. 1, but the gate driver 20 may be configured by an In Panel method as integrated into the display panel 50. For example, the gate driver 20 may be integrated into the display panel 50 by a Gate In Panel (GIP) method.

Figure 2:
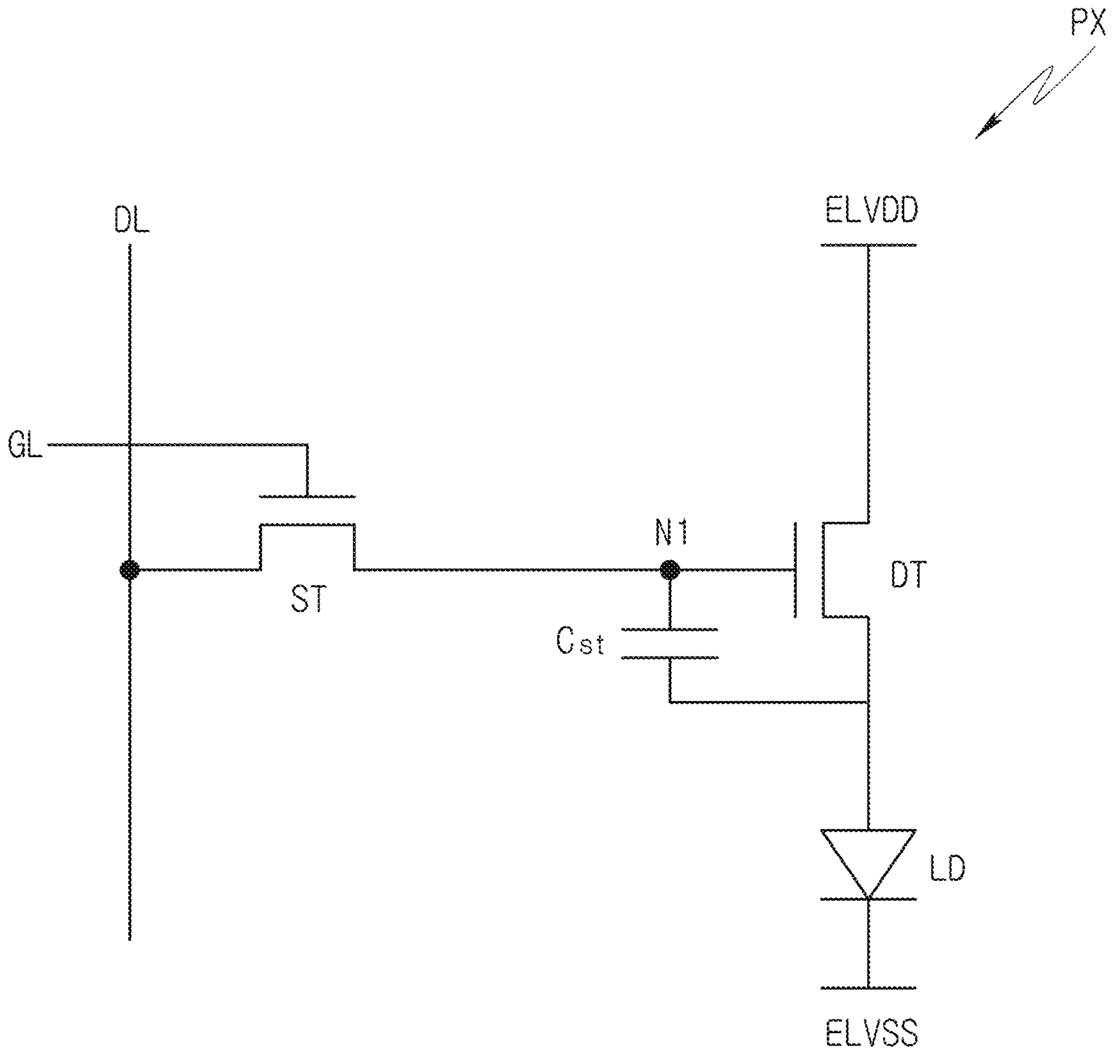
FIG. 2 is a circuit diagram of a pixel according to an embodiment.

FIG. 2 is a circuit diagram of a pixel according to an embodiment.

Referring to FIG. 2, the pixel PX includes a switching transistor ST, a driving transistor DT, a storage capacitor Cst and a light-emitting diode LD.

The switching transistor ST includes a first electrode connected to the data line DL, and a second electrode connected to a first node N1. The switching transistor ST includes a gate electrode connected to the gate line GL. The switching transistor ST is turned on when the gate-on level gate signal is applied to the gate line, thereby transmitting the data signal applied to the data line to the first node N1.

The storage capacitor Cst is connected between the anode of the light emitting diode LD and the first node N1. The storage capacitor Cst may be configured to store voltage corresponding to the difference between a voltage applied to the first node N1 and voltage applied to the anode of the light-emitting diode LD.

The driving transistor DT includes a first electrode receiving a high-potential driving voltage ELVDD, and a second electrode connected to the anode of the light-emitting diode LD. The driving transistor DT includes a gate electrode connected to the first node N1. The driving transistor DT is turned on when voltage having the gate-on level is applied through the first node N1, thereby controlling the amount of driving current flowing in the light emitting diode LD based on the voltage supplied to the gate electrode.

The light emitting diode LD emits light corresponding to the driving current. The light emitting diode LD may emit light in one of red, green, blue and white. The light emitting diode LD may include an organic light emitting diode (OLED), or a micro- to nano-sized inorganic light emitting diode, but the disclosure is not limited to these embodiments.

In some cases, the structure of the pixel PX is not limited to that shown in FIG. 2. According to some embodiments, the pixel PX may further include at least one element for compensating for a threshold voltage of the driving transistor DT or initializing the voltage of the gate electrode of the driving transistor DT and/or the voltage of the anode of the light emitting diode LD.

FIG. 2 shows an example that the switching transistor ST and the driving transistor DT are N-channel metal oxide semiconductor (NMOS) transistors, but the disclosure is not limited to this example. For example, at least some or all of the transistors in each pixel PX may be P-channel metal oxide semiconductor (PMOS) transistors. According to various embodiments, the switching transistor ST and the driving transistor DT may be achieved by low-temperature poly silicon (LTPS) thin-film transistors, oxide thin-film transistors, or low-temperature polycrystalline oxide (LTPO) thin-film transistors.

Figure 3:
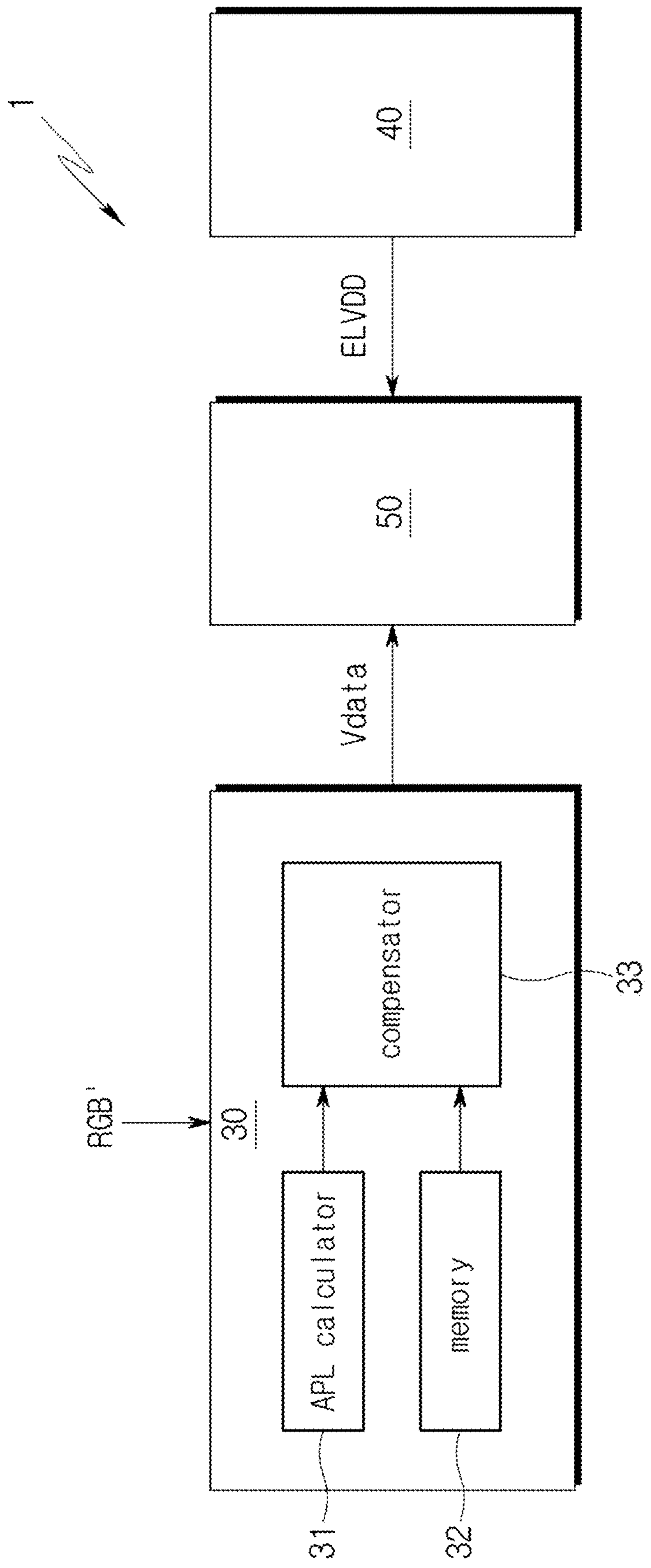
FIG. 3 is a detailed block diagram of a display device according to an embodiment.

FIG. 3 is a detailed block diagram of a display device according to an embodiment.

Referring to FIG. 3, the display device 1 may include the display panel 50 on which the pixels PX receiving the high-potential driving voltage ELVDD to emit light are arrayed, the power supply 40, which supplies the high-potential driving voltage ELVDD to the display panel 50, and the data driver 30 which applies data voltage Vdata corresponding to the input image data RGB' to the display panel 50.

The high-potential driving voltage ELVDD applied to the display panel 50 may be dropped by a load of the display panel 50. In this case, the load of the display panel 50 may be varied depending on an average picture level (APL) of the image data RGB'. When the APL of an input picture is high, electric current consumed by the pixels PX included in the display panel 50 increases, thereby increasing a voltage drop of the high-potential driving voltage ELVDD. On the other hand, when the APL of an input picture is low, electric current consumed by the pixels PX decreases, thereby decreasing a voltage drop of the high-potential driving voltage ELVDD. Change in the voltage drop of the high-potential driving voltage ELVDD causes the brightness of the APL to be decreased or increased, thereby leading to poor picture quality.

According to an embodiment, the display device 1 may be configured to compensate for such a voltage drop (IR drop) of the high-potential driving voltage ELVDD. For example, the data driver 30 may calculate the APL of the input image data RGB', and provide the data voltage Vdata compensated based on the calculated APL to the display panel 50. The APL refers to the average brightness of the image data RGB', which may, for example, be defined as the average brightness of the brightest color in the image data RGB' of one frame.

The data driver 30 may convert the input image data RGB' into the data voltage Vdata, and transmit the data voltage Vdata, which is compensated based on the APL, to the display panel 50. To this end, the data driver 30 may include an APL calculator 31, a memory 32, and a compensator 33.

The APL calculator 31 may calculate the APL of the input image data RGB' in units of frames.

The memory 32 may be configured to store a compensation value of the data voltage Vdata for the APL. The compensation value may be set based on a fluctuation simulation of the high-potential driving voltage ELVDD according to change in the APL. For example, when the calculated APL increases, the voltage drop of the high-potential driving voltage ELVDD may increase, and thus the data voltage Vdata may be compensated to decrease to prevent the brightness from relatively increasing. On the other hand, when the calculated APL decreases, the voltage drop of the high-potential driving voltage ELVDD may decrease, and thus the data voltage Vdata may be compensated to increase to prevent the brightness from relatively decreasing.

Such a compensation value refers to a compensation voltage given as a high-potential driving voltage ELVDD, which may, for example, include values added to or subtracted from a reference voltage to generate the data voltage Vdata. The compensation values may, for example, be stored in the form of a lookup table (LUT) in the memory 32.

The compensation value may previously be stored in the memory 32 when the display device 1 is manufactured. Alternatively, the compensation value may be generated by detecting the fluctuation of the high-potential driving voltage ELVDD by the display device 1 itself or may be received in the display device 1 from the outside while the display device 1 is operating.

The compensator 33 may load the compensation value corresponding to the APL from the memory 32, and generate the data voltage Vdata compensated based on the loaded compensation value. The compensator 33 may transmit the compensated data voltage Vdata to the display panel 50.

The foregoing embodiments show that the data voltage compensation may be performed in units of frames in real-time, but the disclosure is not limited to these embodiments. In other words, the data voltage compensation may be performed in units of a predetermined number of frames or may be performed when a preset compensation condition is satisfied. Further, the data voltage compensation may be based on the APL of a single frame or based on the APL of a plurality of frames.

According to an embodiment, the compensation value for the data voltage Vdata may be based on the APL of the image data RGB', and may be equally applied to the display panel 50 on which the pixels PX are arrayed.

Figure 4:
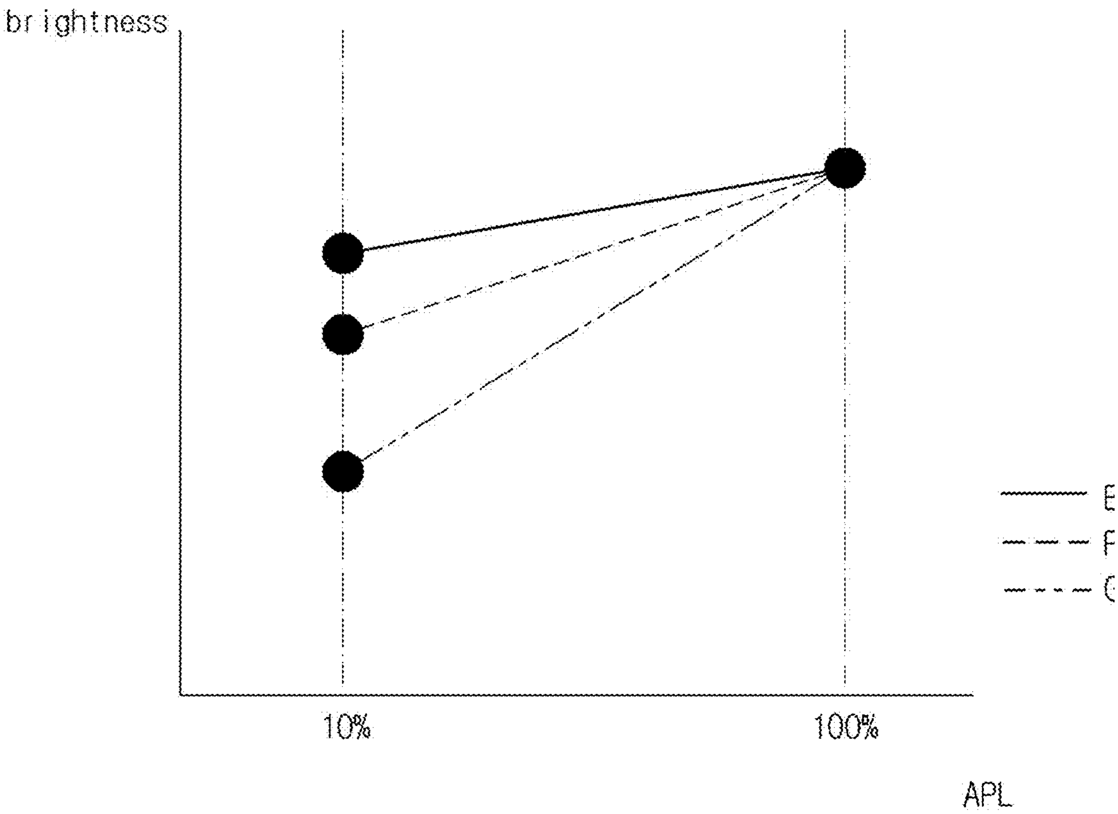
FIGS. 4 to 6 are views for describing distortion of color coordinates.
Figure 5:
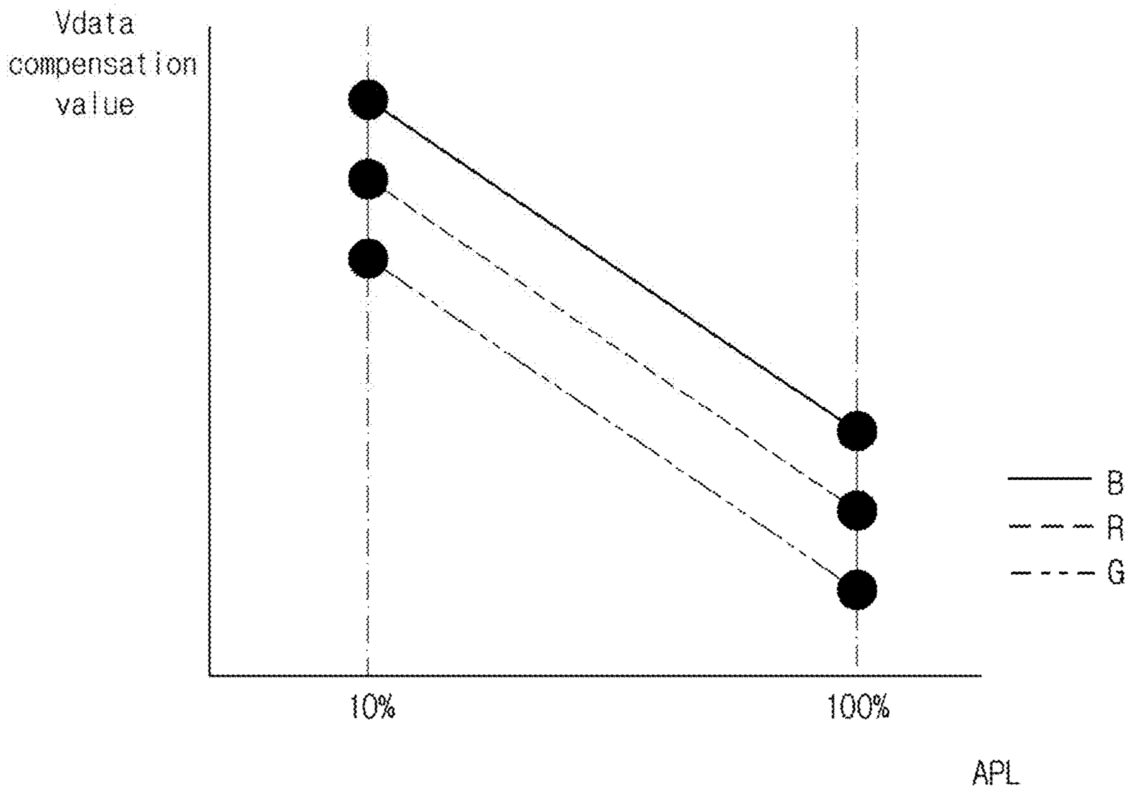
Figure 6:
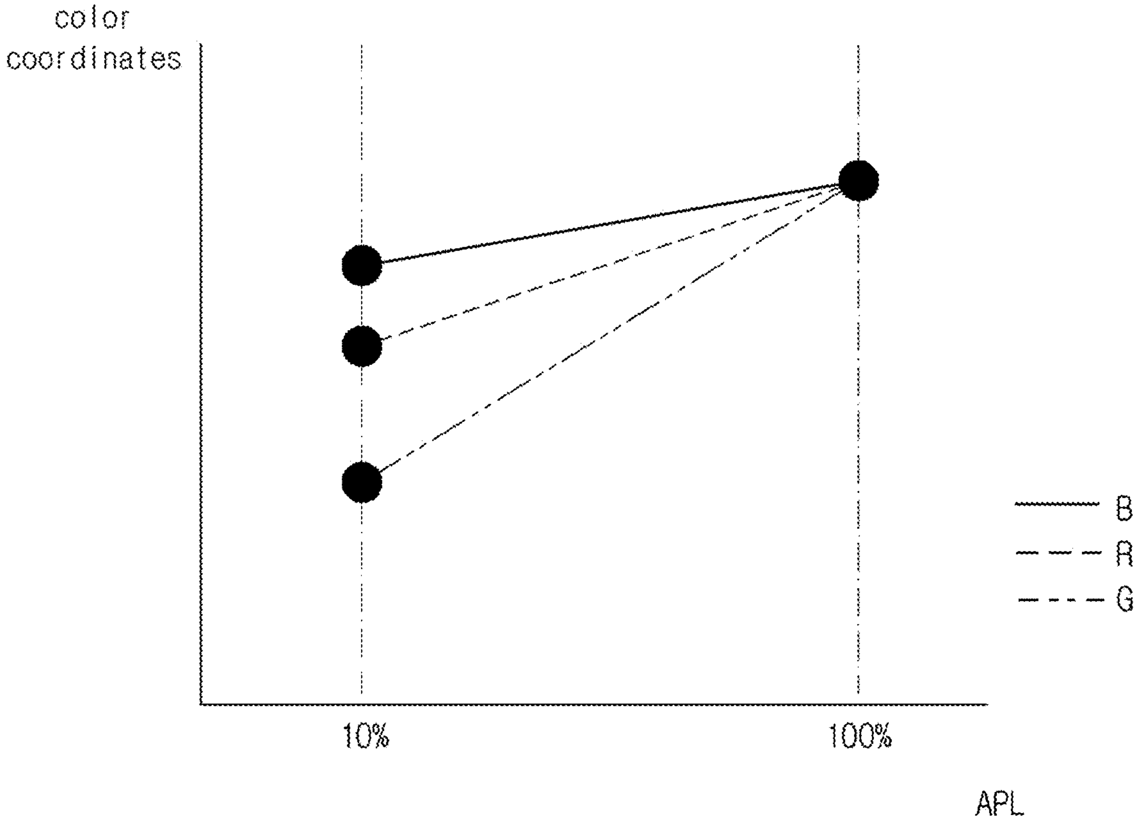

FIGS. 4 to 6 are views for describing distortion of color coordinates.

As described above with reference to FIG. 3, the voltage drop of the high-potential driving voltage ELVDD is varied depending on the amount of electric current consumed by the pixel PX. When the display panel 50 includes the pixels R, G and B for red, green and blue, the blue pixel B emitting light with relatively high brightness may consume more electric current than the other pixels R and G, and the red pixel R emitting light with relatively low brightness may consume less electric current than the other pixels G and B.

Therefore, the pixels R, G and B emitting light in different colors are different in the voltage drop of the high-potential driving voltage ELVDD. Consequently, as shown in FIG. 4, the red pixel R, the green pixel G and the blue pixel B are different in brightness varied depending on the APL.

As described above with reference to FIG. 3, the data driver 30 compensates for the data voltage Vdata based on the APL of the image data RGB', in which, as shown in FIG. 5, a compensation value may be applied to the pixels R, G and B of different colors to have the same luminance change based on the APL.

However, as described above, the pixels R, G and, B of different colors are different in the voltage drop. Therefore, when the same compensation value is applied to the pixels R, G and B of different colors, there may be a problem that brightness and color coordinates are significantly distorted according to the APL as shown in FIG. 6. This may cause crosstalk among the pixels R, G and B, leading to poor picture quality.

Below, a detailed configuration of the data driver 30 for solving this problem will be described.

Figure 7:
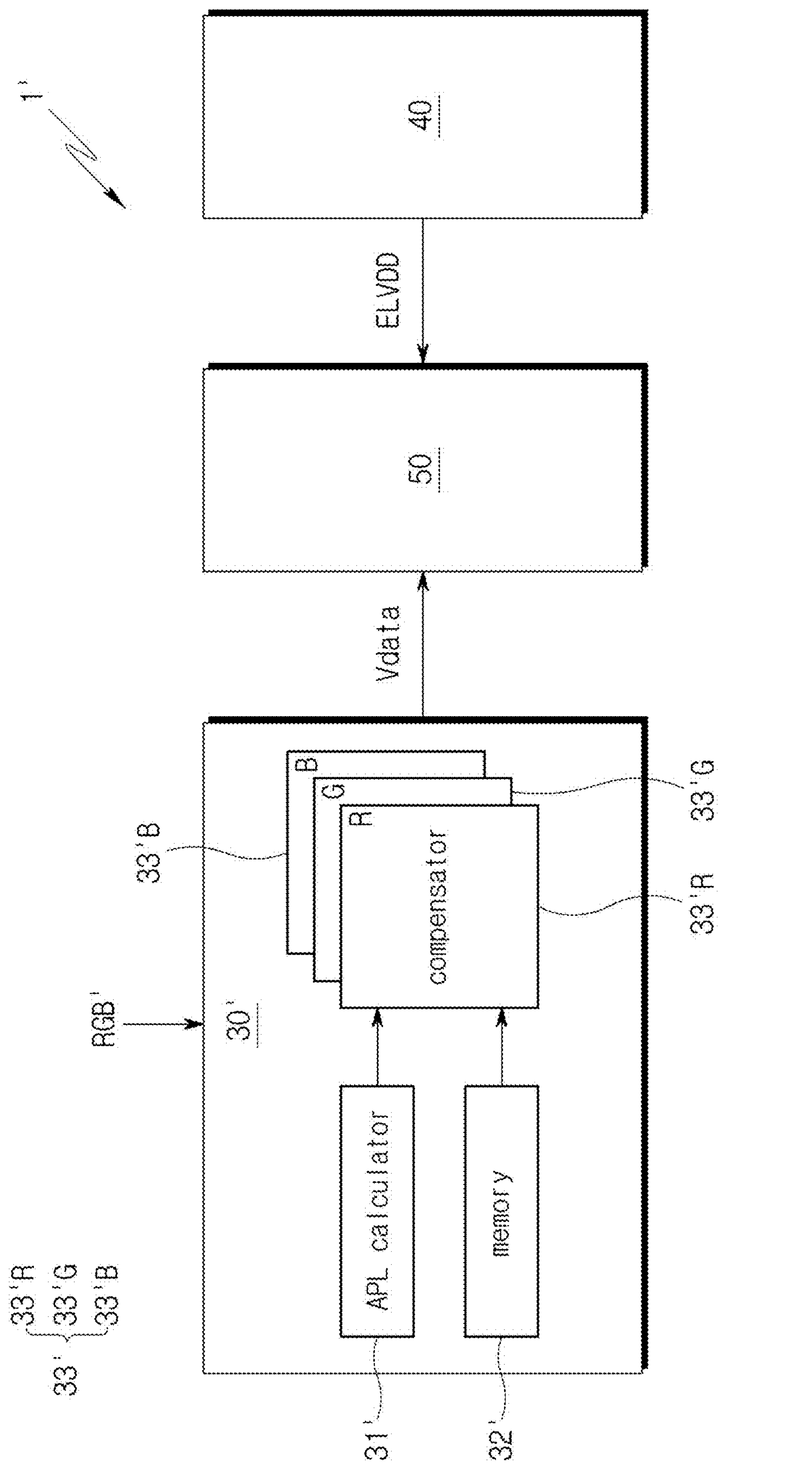
FIG. 7 is a detailed block diagram of a display device according to another embodiment.

FIG. 7 is a detailed block diagram of a display device according to another embodiment.

Referring to FIG. 7, a display device 1' may include a display panel 50 on which pixels PX emitting light by receiving a high-potential driving voltage ELVDD are arrayed, a power supply 40 which supplies the high-potential driving voltage ELVDD to the display panel 50, and a data driver 30' which applies data voltage Vdata corresponding to input image data RGB' to the display panel 50.

The data driver 30' may convert the input image data RGB' into the data voltage Vdata, and transmit the data voltage Vdata, which is compensated based on the APL, to the display panel 50. To this end, the data driver 30' may include an APL calculator 31', a memory 32', and a compensator 33'.

In this embodiment, the compensator 33' is provided with regard to each of the pixels R, G and B emitting light in different colors. In other words, the compensator 33' includes a first compensator 33'R to compensate for the data voltage Vdata of the red pixel R, a second compensator 33'G to compensate for the data voltage Vdata of the green pixel G, and a third compensator 33'B to compensate for the data voltage Vdata of the blue pixel B.

The first to third compensators 33'R to 33'B may have the same circuit structure. Below, a detailed structure of the data driver 30', including the first to third compensators 33'R to 33'B will be described.

Figure 8:
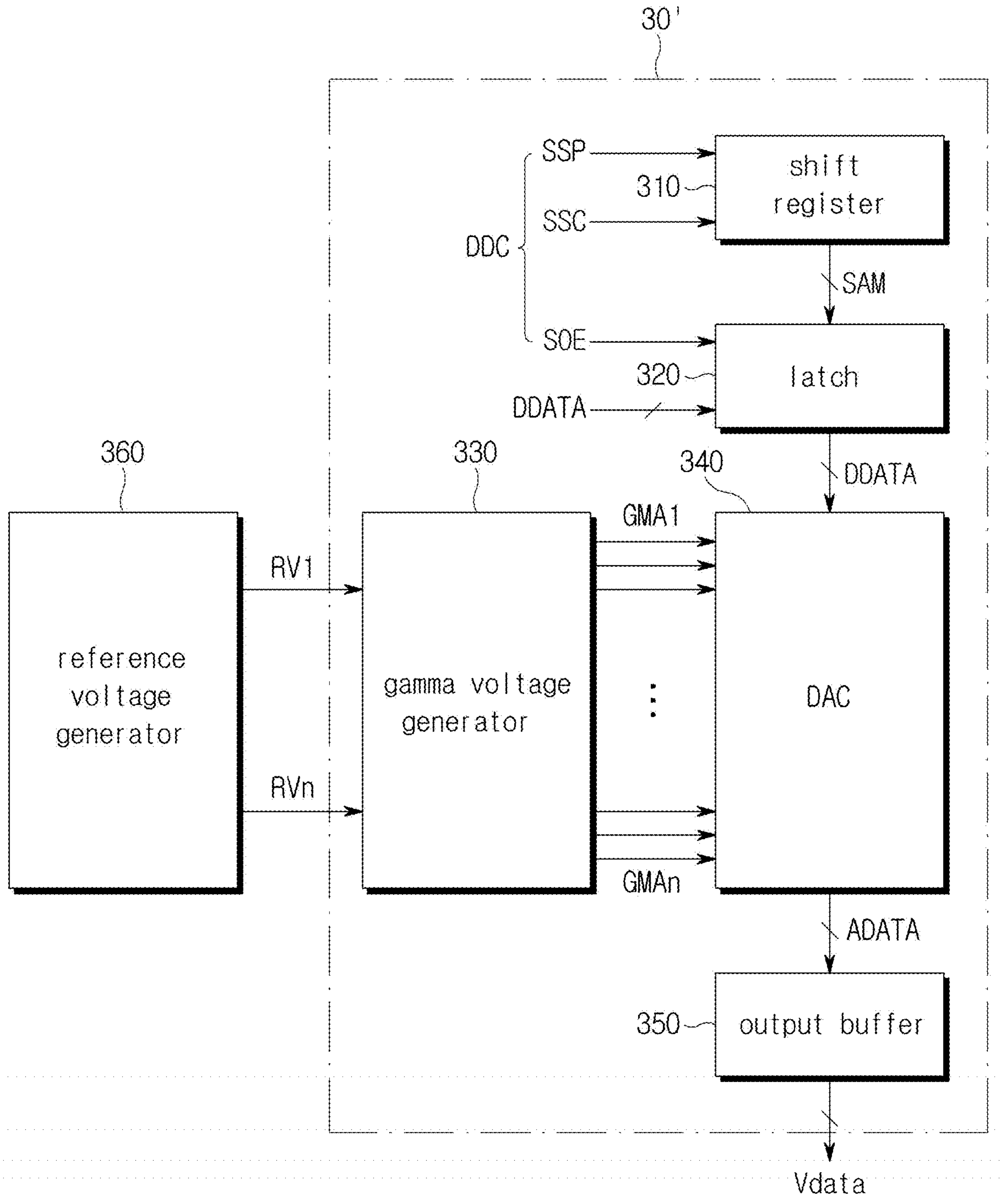
FIG. 8 is a block diagram of a data driver according to an embodiment.

FIG. 8 is a block diagram of a data driver according to at least one embodiment.

Referring to FIG. 8, the data driver 30' includes a gamma voltage generator 330 to generate gamma voltages GMA1 to GMAn based on a reference voltage output from first to nth reference voltage terminals RV1 to RVn of a reference voltage generator 360. The data driver 30' converts digital image data RGB' received from the timing controller 10 into analog data voltage Vdata based on the gamma voltages GMA1 to GMAn, and outputs the analog data voltage Vdata.

The reference voltage generator 360 generates and outputs the reference voltage based on a voltage supplied from the outside. According to an embodiment, the reference voltage generator 360 may generate and output the reference voltage considering the compensation value set based on the APL of the input image data RGB'.

In this case, the compensation values may be differently given to the data driver 30' according to the corresponding pixels R, G and B. For example, the compensation values may be individually set with regard to the pixels R, G, and B of different colors, and the reference voltages generated reflecting the compensation values may also be individually provided with respect to such pixels R, G and B.

The reference voltage generator 360 may be provided outside the data driver 30' as shown in FIG. 8, or may be included in the data driver 30'. The gamma voltage generator 330 may divide voltage based on the reference voltages output from the reference voltage generator 360, and generate gamma voltages GMA1 to GMAn based on the divided voltages. Since the different reference voltages are given with regard to the pixels R, G and B of different colors, the different gamma voltages GMA1 to GMAn are provided to such pixels R, G and B.

The data driver 30' may further include a shift register 310, a latch 320, a digital-analog converter (DAC) 340, and an output buffer 350.

The data driving control signal CONT2 provided by the timing controller 10 includes a source start pulse (SSP) signal, a source sampling clock (SSC) signal, a source output enables (SOE) signal, etc. The SSP signal controls a data sampling start point of the data driver 30'. The SSC signal is a clock signal for controlling a data sampling operation in the data driver 30' with respect to a rising or falling edge. The SOE signal controls the output of the data driver 30'.

The shift register 310 outputs a sampling signal SAM in response to the SSP and SSC signals output from the timing controller 10. The latch 320 sequentially samples digital data signal DDATA corresponding to the image data RGB' in response to the sampling signal SAM output from the shift register 310, and simultaneously outputs the digital data signal DDATA of one line sampled corresponding to the SOE signal.

The DAC 340 converts the digital data signal DDATA of one line into an analog data signal ADATA corresponding to the first to nth gamma voltages GMA1 to GMAn output from the gamma voltage generator 330. The output buffer 350 amplifies (or amplifies and compensates for) the analog data signal ADATA output from the DAC 340, and outputs it as the data voltage Vdata to each data line.

Figure 9:
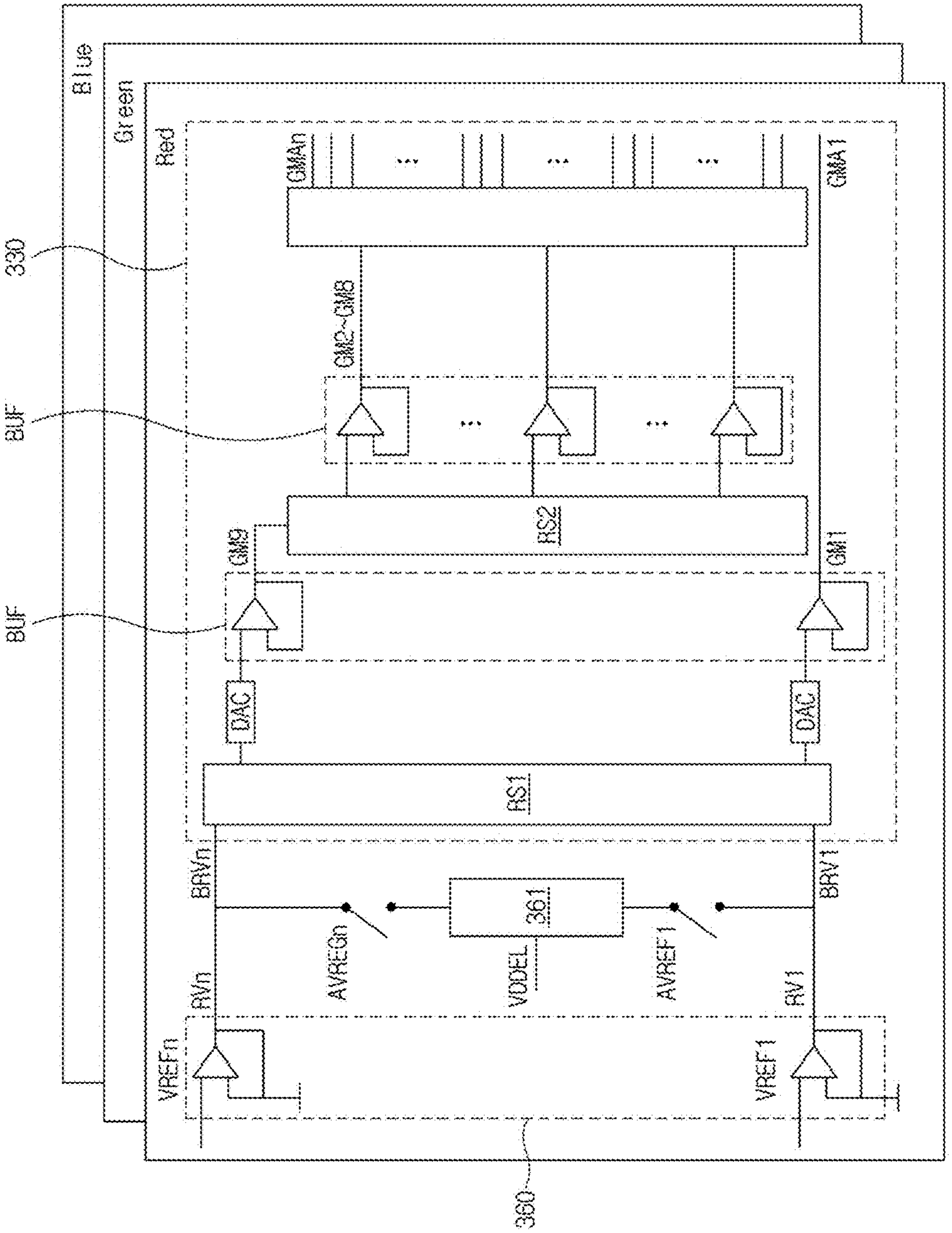
FIG. 9 is a view showing an internal configuration of a data driver according to an embodiment.

FIG. 9 is a view showing an internal configuration of a data driver according to an embodiment.

Referring to FIGS. 8 and 9, the data driver 30' may perform voltage compensation based on the APL of the input image data RGB'. The data driver 30' may use a compensation method of reflecting a compensation value, which is previously stored corresponding to the APL, to a reference voltage VREF. For example, the reference voltage generator 360 may include a compensation circuit 361 to select the compensation value corresponding to the APL of the image data RGB', and add or subtract the selected compensation value to or from the reference voltage VREF.

The data driver 30' may include the reference voltage generator 360 to generate the reference voltage VREF by reflecting the compensation value provided from the compensation circuit 361, and the gamma voltage generator 330 including a resistor string portion for dividing voltage based on the reference voltage VREF to generate the gamma voltages GMA1 to GMAn based on the divided voltages.

In the reference voltage generator 360, the first reference voltage terminal RV1 is connected to a low gamma voltage terminal BRV1 (or a low grayscale gamma voltage terminal) of the gamma voltage generator 330, and the nth reference voltage terminal RVn is connected to a high gamma voltage terminal BRVn (or a high grayscale gamma voltage terminal) of the gamma voltage generator 330.

The compensation circuit 361 is illustrated as a separate block. Alternatively, the compensation circuit 361 may be provided as a separate circuit or element so that voltage can be indirectly added to or subtracted from the reference voltages VREF output from the first reference voltage terminal RV1 and the nth reference voltage terminal RVn of the reference voltage generator 360.

According to some embodiments, when the APL of the image data RGB' is increased compared to a reference value, the compensation circuit 361 is configured to perform compensation (adding compensation) of adding a compensation value to the reference voltage VREF. On the other hand, when the APL is decreased compared to the reference value, the compensation circuit 361 is configured to perform compensation (subtracting compensation) by subtracting a compensation value from the reference voltage VREF.

The compensation circuit 361 makes the low gamma voltage terminal BRV1 and the high gamma voltage terminal BR Vn of the gamma voltage generator 330 do not directly receive the reference voltage VREF output from the reference voltage generator 360 but receive the reference voltage subjected to the addition or subtracting compensation.

For example, the low gamma voltage terminal BRV1 receives a compensation voltage AVREF1 (hereinafter, referred to as a lower reference voltage) of a low reference voltage VREF1±the high-potential driving voltage ELVDD, and the high gamma voltage terminal BRVn receives a compensation voltage AVREFn (hereinafter, referred to as a higher reference voltage) of a high reference voltage VREFn±the high-potential driving voltage ELVDD.

The gamma voltage generator 330 may include a plurality of resistor strings RS1, RS2 and RS3.

The first resistor string RS1 generates some gamma reference voltages GM1 and GM9 by dividing the voltage between the lower reference voltage VREF1+AVREF1 and the upper reference voltage VREFn+AVREFn. Some selected gamma reference voltages GM1 and GM9 may be output through a buffer BUF.

Some gamma reference voltages GM1 and GM9 are distributed through the second resistor string RS2. The second resistor string RS2 may select the other gamma reference voltages GM2 to GM8 from the distributed voltages, and output the selected gamma reference voltages GM2 to GM8 through the buffer BUF.

The third resistor string RS3 may distribute the gamma reference voltages GM1 to GM9 and output the gamma voltages GMA1 to GMAn corresponding to the whole grayscales. The generated gamma voltages GMA1 to GMAn may be provided to the DAC 340 and used for generating the data voltage Vdata.

In some of the foregoing embodiments, the compensation circuit 361 and the reference voltage generator 360 may be provided for each of the pixels R, G and B of different colors. In other words, the compensation values and the reference voltages reflecting these compensation values may be individually provided corresponding to the pixels R, G and B of different colors. Consequently, different sets of gamma voltages are provided to the pixels R, G and B of different colors, and the data voltages Vdata compensated as a result are generated independently of one another.

Figure 10:
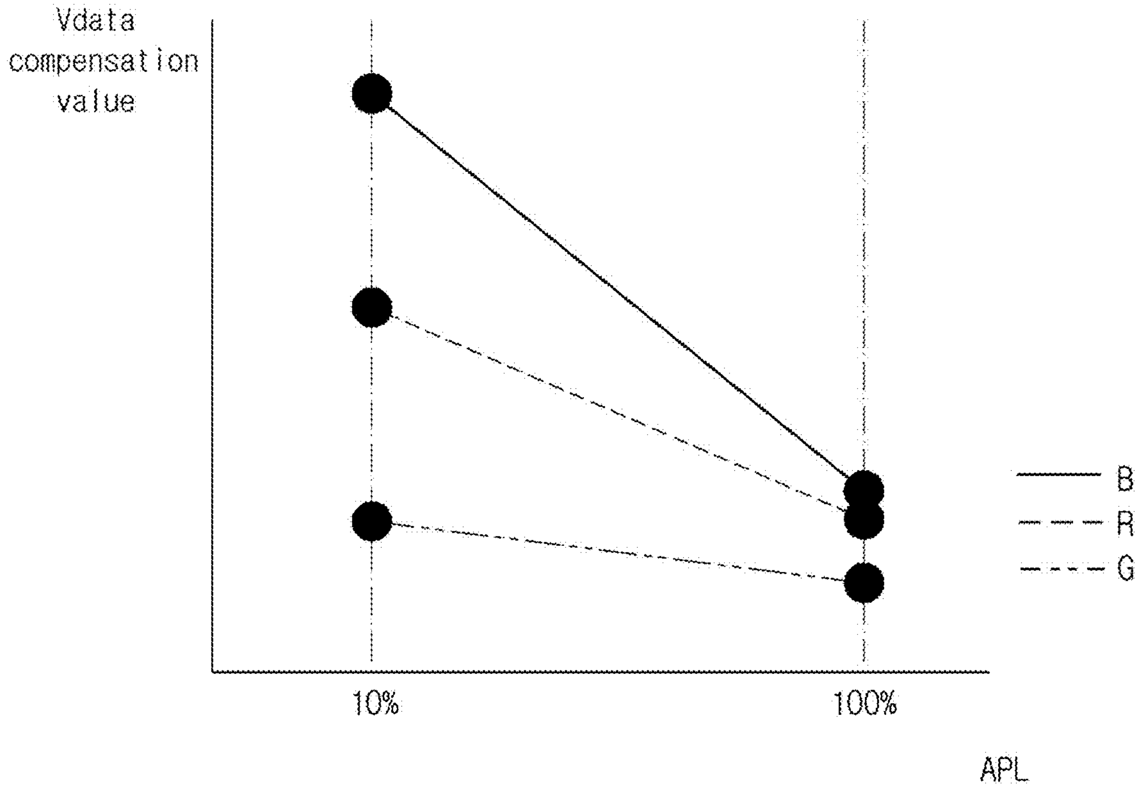
FIGS. 10 and 11 are graphs for describing a compensation method according to an embodiment.
Figure 11:
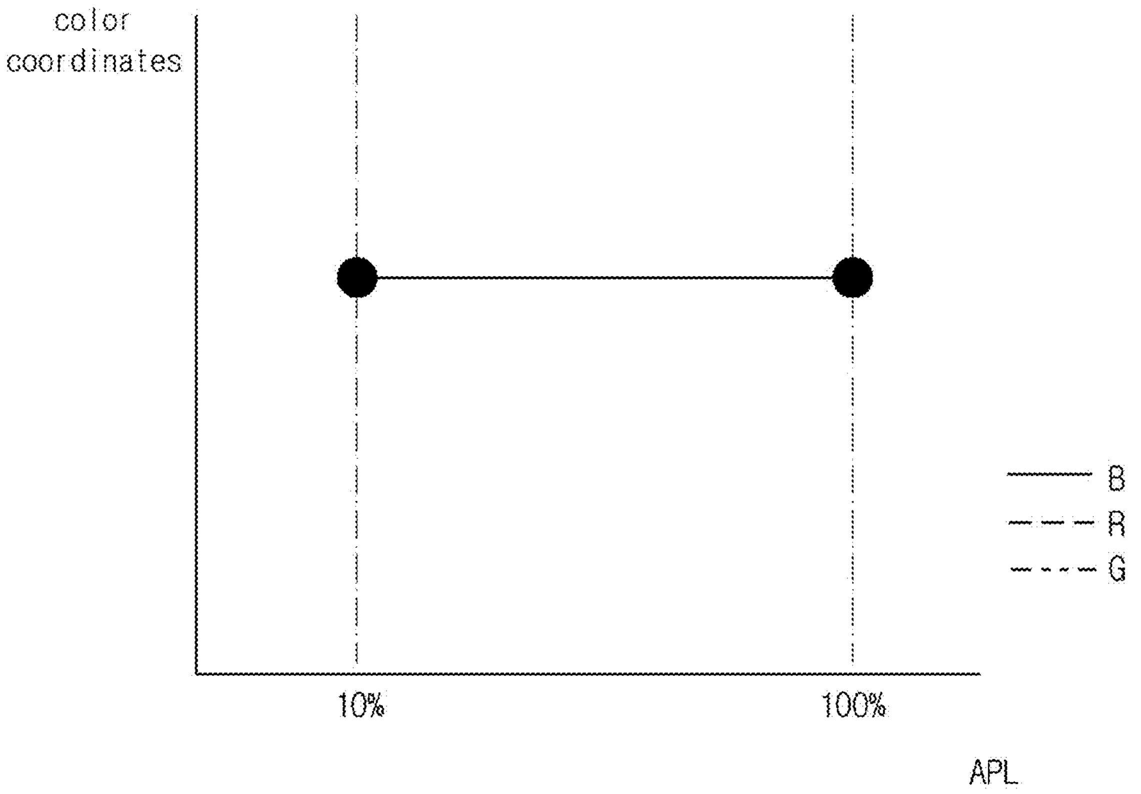

FIGS. 10 and 11 are graphs for describing a compensation method according to an embodiment.

As described above with reference to FIGS. 8 and 9, the data driver 30' according to an embodiment compensates the data voltage Vdata based on the APL of the image data RGB', in which the independent compensation values respectively corresponding to the pixels R, G, and B of different colors and the reference voltages reflecting these independent compensation values are provided. Therefore, as shown in FIG. 10, different compensation values are respectively applied to the pixels R, G and B of different colors.

Such compensation values are set adaptively to the pixels R, G, and B which are different in the voltage drop of the driving voltage ELVDD, and therefore the color coordinates based on the APL are maintained without being distorted with respect to the pixels R, G and B after the compensation as shown in FIG. 11.

According to some embodiments, the display device compensates for the voltage drop of the high-potential driving voltage, and relieves the difference in brightness among the pixels, thereby improving display quality.

According to some embodiments, the display device solves the problem that the color coordinates are distorted when the voltage drop of the high-potential driving voltage is compensated.

It is apparent to a person having ordinary knowledge in the art, to which the disclosure pertains, that the disclosure can be embodied in other specific forms without changing the technical concept or essential features. Accordingly, it should be understood that above-described embodiments are for illustrative purpose only but not in any way for restriction thereto.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel on which a plurality of pixels of different colors are arrayed;

a power supply configured to supply a high-potential driving voltage to the display panel; and a data driver configured to calculate an average picture level of input image data, and generate a data voltage based on a compensation value for compensating for a voltage drop of the high-potential driving voltage based on the calculated average picture level, wherein the compensation value is independently set for each of the colors, and wherein the data driver comprises:

a shift register configured to output a sampling signal in response to a data driving control signal output from a timing controller;

a latch configured to sample the image data into a digital data signal in response to the sampling signal;

a reference voltage generator configured to generate a reference voltage;

a gamma voltage generator configured to generate gamma voltages based on the reference voltage;

a digital-analog converter configured to convert the digital data signal into an analog data signal based on the gamma voltages and output the analog data signal as the data voltage; and a compensation circuit configured to output the compensation value corresponding to the calculated average picture level, wherein the gamma voltage generator is configured to receive a reference voltage to or from which the compensation value is added or subtracted.

2. The display device of claim 1, wherein the data driver further comprises:

a memory configured to store the compensation value based on the average picture level.

3. The display device of claim 1, wherein the compensation circuit and the reference voltage generator are independently provided corresponding to each of the colors.

4. The display device of claim 3, wherein the gamma voltages are provided as different sets of gamma voltages to the pixels of different colors.

5. The display device of claim 4, wherein the data driver is configured to set the compensation value for decreasing the data voltage when the calculated average picture level increases, and set the compensation value for increasing the data voltage when the calculated average picture level decreases.

6. The display device of claim 4, wherein the compensation circuit is configured to perform adding compensation for adding the compensation value to the reference voltage when the average picture level increases, and perform subtracting compensation for subtracting the compensation value from the reference voltage when the average picture level decreases.

7. The display device of claim 1, wherein the compensation value is one previously stored in a memory of the display device of the following: generated by detecting a fluctuation of the high-potential driving voltage by the display device, or received from outside of the display device.

8. A compensation method for a display device including a plurality of pixels of different colors, the method comprising:

calculating an average picture level of input image data;

generating a data voltage based on a compensation value for compensating for a voltage drop of a high-potential driving voltage based on the calculated average picture level, wherein the compensation value is independently set for each of the colors, and wherein the generating the data voltage includes:

generating a sampling signal in response to a data driving control signal output from a timing controller;

sampling the input image data into a digital data signal in response to the sampling signal;

generating a reference voltage;

generating gamma voltages based on the reference voltage;

converting the digital data signal into an analog data signal based on the gamma voltages and outputting the analog data signal as the data voltage;

outputting the compensation value corresponding to the calculated average picture level; and receiving a reference voltage to or from which the compensation value is added or subtracted.

* * * * *